(No Model.)
4 Sheets—Sheet 1.
G. ESTERLY.
GRAIN HARVESTING MACHINE.
No. 262,753. Patented Aug. 15, 1882.
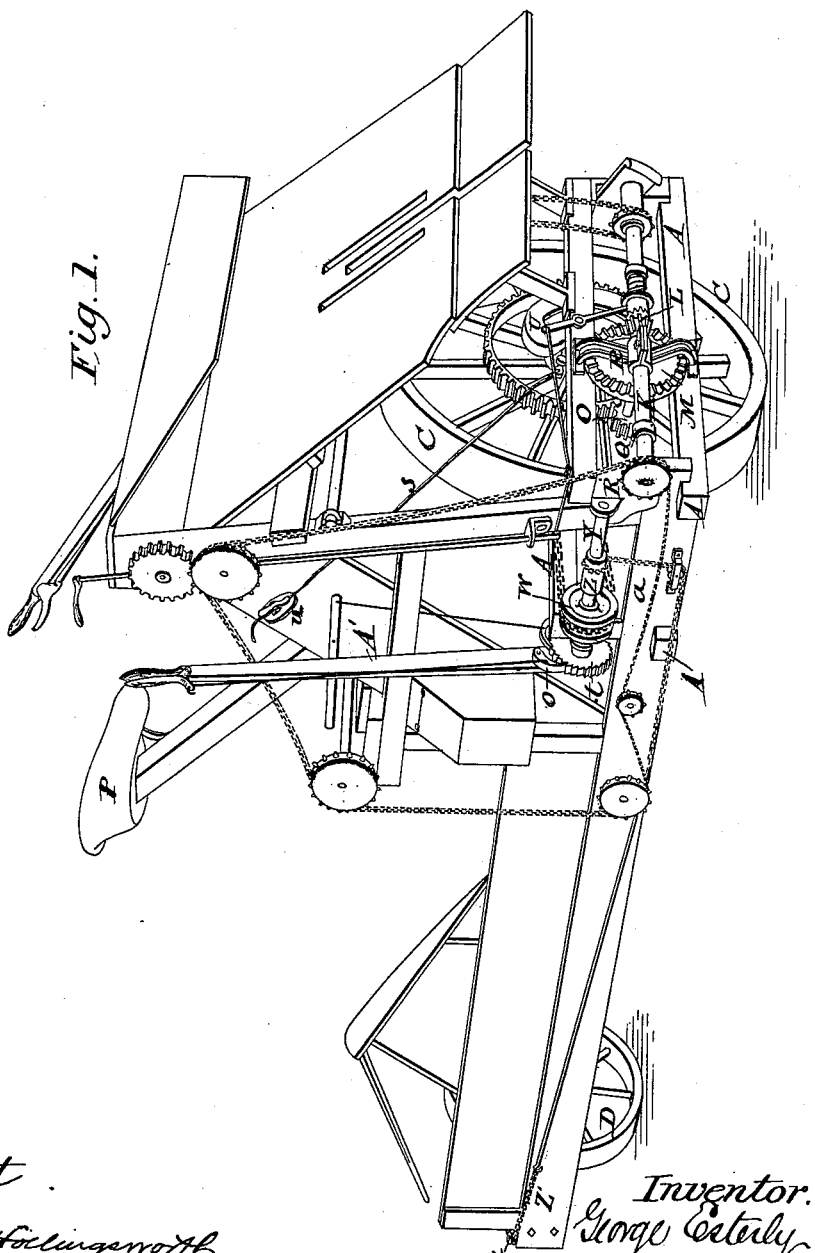

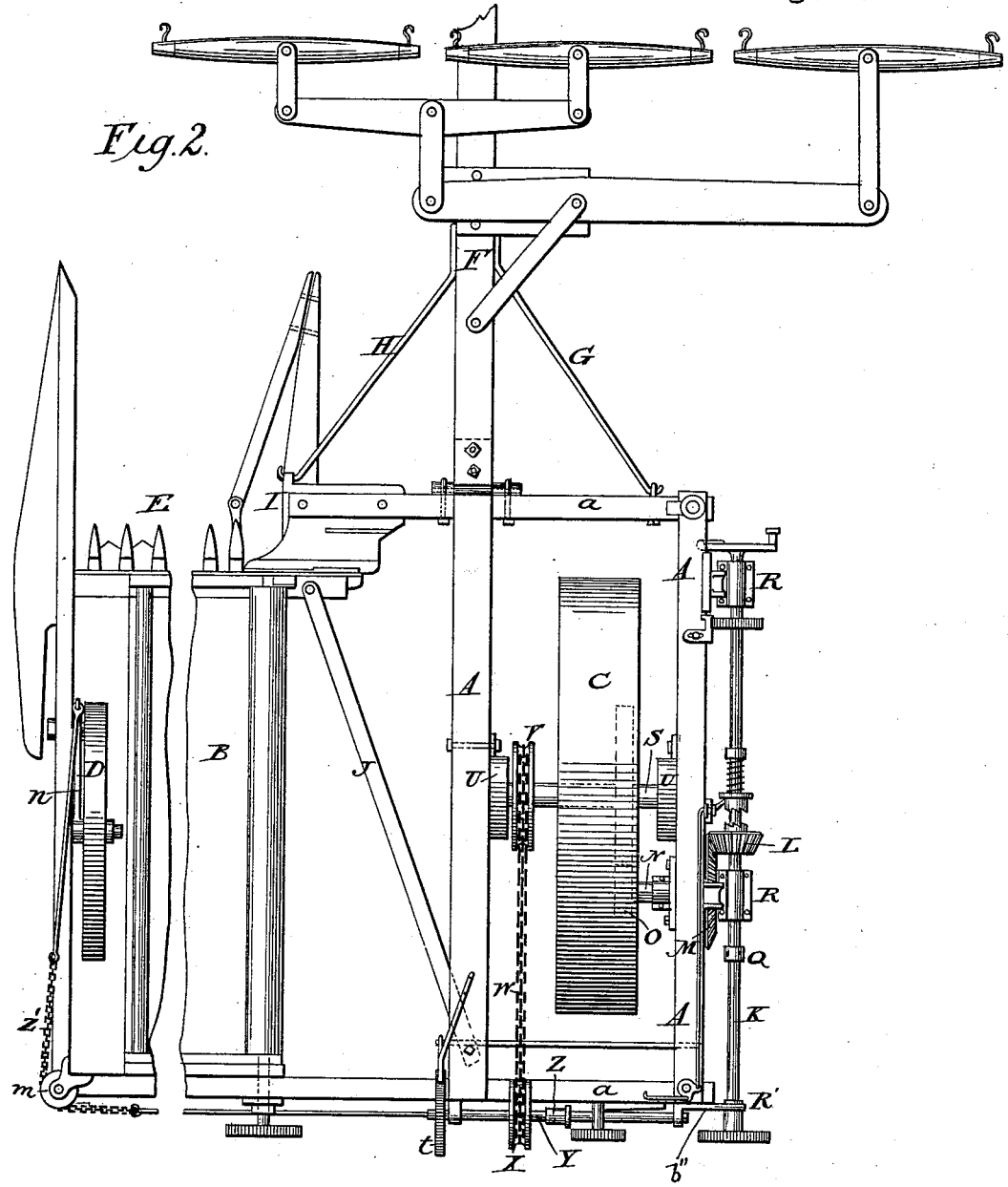

(No Model.) 4 Sheets—Sheet 3.
G. ESTERLY.
GRAIN HARVESTING MACHINE.
No. 262,753. Patented Aug. 15, 1882.
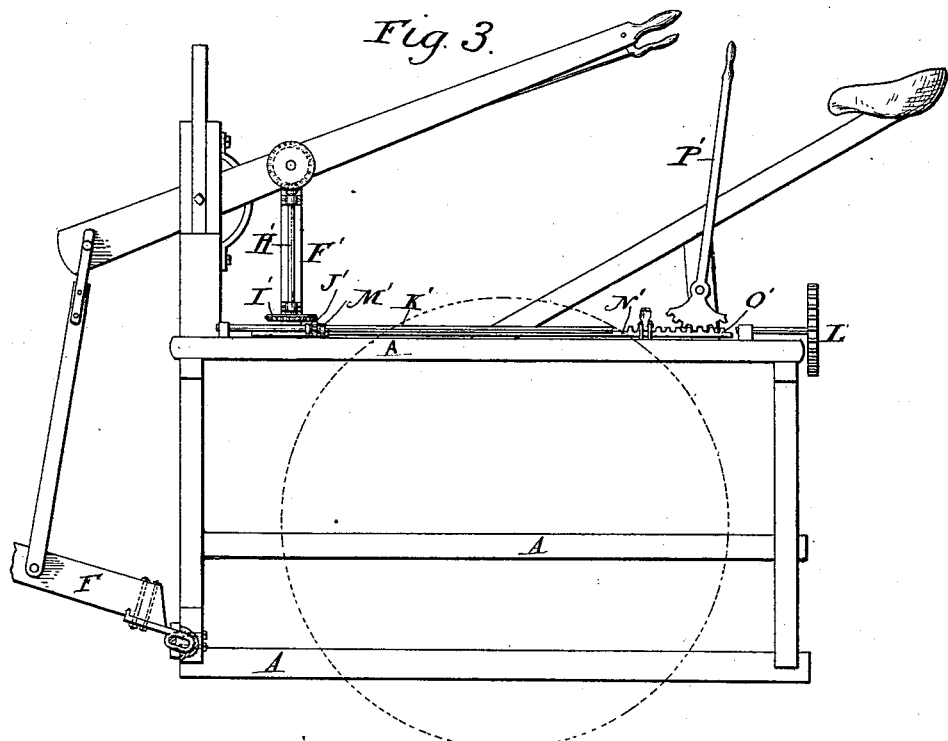
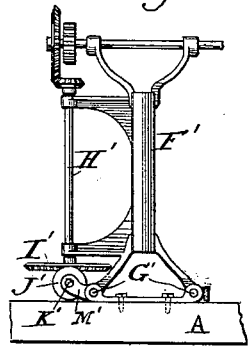
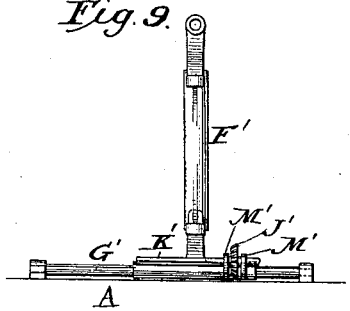
Attest.
Sidney P. Hollingsworth
Newton Wyckoff
Inventor.
George Esterly
By his Atty
Philip T. Dodge (No Model.)  4 Sheets—Sheet 4.
G. ESTERLY.
GRAIN HARVESTING MACHINE.
No. 262,753.  Patented Aug. 15, 1882.
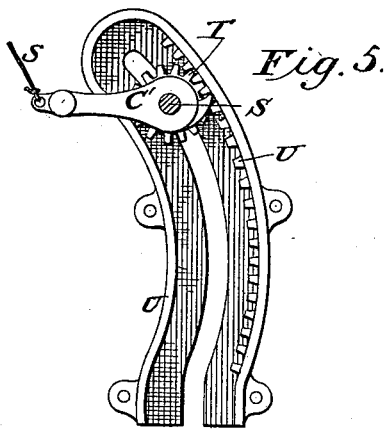
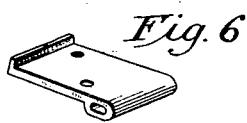
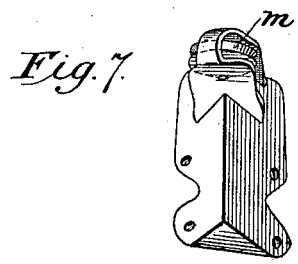
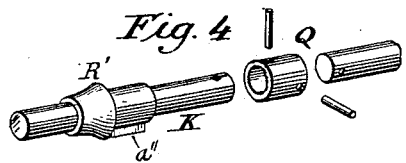
Attest
Sidney P. Hollingsworth
Newton Wyckoff.
Inventor.
George Esterly.
By his atty
Philip T. Dodge

UNITED STATES PATENT OFFICE.

GEORGE ESTERLY, OF WHITEWATER, WISCONSIN.

GRAIN-HARVESTING MACHINE.

SPECIFICATION forming part of Letters Patent No. 262,753, dated August 15, 1882.

Application filed May 23, 1882. (No model.)

*To all whom it may concern:*

Be it known that I, GEORGE ESTERLY, of Whitewater, in the county of Walworth and State of Wisconsin, have invented certain Improvements in Grain-Harvesting Machines, of which the following is a specification.

The present invention relates more particularly to the class of grain-harvesting machines wherein the cut grain is elevated from the platform over the main wheel by means of endless belts or aprons commonly known as "canvases."

One improvement relates to the peculiar manner of bracing the frame and connecting the draft-pole or tongue therewith to prevent the frame from being twisted out of form by the strains to which it is subjected when in use, the improvement in this regard consisting in the combination, with the frame and a tongue having preferably a longitudinal sliding motion in relation thereto, of two braces or draft-rods extending from opposite sides of the tongue to the frame, and a brace extending diagonally backward from the main shoe to the inside of the main frame.

Another feature of the invention consists in a construction designed to avoid the difficulties which are experienced on account of the bending and consequent cramping of the main driving-shaft, due to the sagging and twisting of the main frame, the improvement in this regard consisting in dividing the shaft at or near the center and connecting its parts by a universal joint, the shaft thus divided being sustained in three independent bearings, whereby it is kept in line.

Another feature of the invention relates to the mechanism employed for raising and lowering the main frame in relation to the ground-wheel, and is designed to prevent the frame from being raised accidentally when the machine offers an excessive resistance to the draft or propelling strain. The improvement consists in combining with a dog or stop by which the elevating devices are prevented from operating an operating-cord extending upward within reach of the driver and a clamping device whereby the driver may secure said cord at will to hold the device out of action.

Another improvement consists in the peculiar arrangement and location of the devices whereby the frame-elevating mechanism is operated, as hereinafter explained.

Referring to the accompanying drawings, Figure 1 is a perspective view of my machine. Fig. 2 represents a top plan view of the main frame and platform of my improved machine, a portion of the platform being broken away in order to reduce the size of the figure and the grain-elevating devices being removed in order to expose the parts beneath. Fig. 3 is a side elevation of the reel-standard and gearing so far as they pertain to the harvester. Fig. 4 is a perspective view of the main shaft. Fig. 5 is a view showing the mechanism by which the main frame is elevated. Fig. 6 is a perspective view of the plate by which the sliding tongue is connected to the main frame. Fig. 7 is a view of the plate by which the chain-supporting roll is sustained; Figs. 8 and 9, side elevations of the reel-standard and the gearing connected with the harvester.

A represents a horizontal main frame constructed rigidly in a rectangular form, with laterally-extending arms or bars a, to which the horizontal platform B is rigidly secured, as usual. The machine is carried by the main wheel C, located in the main frame, and the smaller wheel, D, located at the grain side of the platform, as usual, the mode in which the wheels are attached or adjusted being hereinafter described.

The platform will be provided at its front edge with cutting mechanism E, of ordinary construction, and will also be provided with a horizontal endless apron or equivalent means for conveying the cut grain horizontally to the elevating mechanism, as usual, these features being well understood by those familiar with the art and constituting no part of my invention.

F represents the draft-pole or tongue, extending forward from the main frame. Hitherto it has been customary to attach the tongue rigidly to the frame, with a brace on one or both sides, and consequently much trouble has been experienced from the fact that when the machine was drawn forward the lateral and oblique strains encountered in advancing the frame and cutters frequently caused the frame to lose its rectangular form and become twisted, or, as it is commonly known in the art "diamonded." This twisting of the frame causes a general disarrangement of the mechanism, producing excessive friction upon the various shafts and the various bearings, increasing greatly the amount of power required to operate the machine, and interfering materially with its proper action. In order to overcome this difficulty I attach the tongue to the frame by a sliding joint, which will admit of its moving forward and backward to a limited extent, and extend from the tongue backward on opposite sides two diverging braces, G and H, the former connected to the machine or the main frame near its stubble side, and the latter connecting to the main shoe I at the inner corner of the platform. These braces G and H may be connected to the frame and the tongue in any suitable manner, provided they serve to receive the entire strain of the draft exerted in propelling the machine. The construction of the sliding joint by which the tongue is attached and the arrangement of the braces is to be such that no pulling strain will be transmitted through the joint to the frame. From the shoe I backward to the rear corner of the main frame A, I extend a diagonal brace, J, bolting the ends of the same firmly to the shoe and frame respectively, as represented in Fig. 2. By combining with the frame the loose tongue and the three braces in the manner described I am enabled to maintain the frame in a true rectangular form under the most severe strains to which it is subjected in the field. The object of using the loose connection for the tongue is to insure the transmission of the draft at all times to the braces. Good results, as compared with the ordinary machines, may be secured when the peculiar arrangement of braces shown is used in connection with a tongue bolted rigidly to the frame, and the tongue may be thus applied without departing from the limits of my invention; but for the reasons before given it is preferred to use the sliding tongue in all cases. The brace J may be connected to the frame a short distance forward from the rear end of the latter; but it is preferred to make the connection, as shown in the drawings, at the extreme rear end. The shoe may be of ordinary construction, the form and the manner in which it is connected to the braces being susceptible of modification without changing the function of the parts.

Passing next to the arrangement of the main shaft, which is represented at K, Figs. 1 and 2, it will be seen lying horizontally along the side of the frame, supported in brackets thereon. From this shaft motion is communicated through suitable gearing of any ordinary or approved construction to the working parts of the machine. As the members carried by the shaft will be of ordinary construction, it is deemed unnecessary to describe them in detail herein. The shaft derives its motion from a beveled pinion, L, attached to its middle and engaging in a beveled pinion, M, which is in turn driven through its shaft N from a spur-pinion, O, located on the inner end of said shaft and engaging with a gear-wheel on the main ground-wheel. In practice it is found that the frame will frequently sag or bend at the middle, thereby bending the shaft K and causing it to bind in the bearings. I therefore divide the shaft transversely and connect the two parts by a universal joint, Q, as shown in Figs. 1, 2, and 4. This coupling, which may be of any approved construction, consists preferably of a single sleeve or collar slipped over the adjoining ends of the shaft-sections, and connected thereto by means of pins or pivots passed through it and through the respective shaft-sections, at right angles to each other, as indicated in the drawings. This joint permits the shaft to bend or spring to a reasonable extent without binding. In order to give the shaft suitable support upon the frame, it is mounted in three bearings, R, R, and R', on the side of the frame. The joint is located in rear of the middle bearing, R, and in order that the rear end of the shaft may not bind in the after bearing, R', the latter is allowed a limited rocking play or movement. This is secured by constructing the bearing, as shown in Figs. 2 and 4, in the form of a flanged sleeve or collar having a longitudinal rib, $a''$, on one side, as shown in Fig. 4, and inserting the ribbed end through a supporting-arm, $b''$, on the frame, as plainly represented, as shown in Fig. 2. The sleeve is prevented from rotating in the supporting-arm by means of the rib, but is free to rock within the arm to a sufficient extent to adapt it to the movements of the shaft. The essential feature of the invention in this regard consists in providing the main shaft with a joint between its ends, and so long as this feature is retained the details of construction may be modified as desired.

As usual in this class of machines, the main wheel is mounted loosely on a horizontal axle, S, which latter has its ends provided with pinions T, mounted in curved guide-plates U, the latter having within their front sides cog-teeth or racks to engage with the pinions, so that by turning the shaft backward the pinions are caused to act upon the teeth of the plate U and elevate the main frame, as usual. The rotation of the axle to secure the elevation of the frame is obtained by securing to the axle a grooved pulley, V, and extending from the latter backward a chain, W, winding on a drum, X, at the rear end of the frame. This drum is mounted on a horizontal shaft, Y, located on the rear end of the main frame, and provided also with a second drum, Z, from which a chain extends downward beneath the guide-pulleys, and thence horizontally to the outer rear corner of the platform, whence it extends around the guide-pulley $m$ and forward to an elbow-lever, $n$, carrying the outer wheel, D, as plainly represented in Figs. 1 and 2, so that the rotation of the shaft Y, operating the two drums and taking up their respective chains, causes the main frame to be raised upon the two wheels C and D at the same time.

The lifting mechanism above described is not claimed in itself as of my invention; but it differs from mechanism hitherto employed in that the winding-drums are located on the rear end of the frame near the base of the machine instead of being located at an elevated point on the frame, as has hitherto been the custom.

The location of the shaft in the manner described and shown permits the application thereto of a very long upright hand-lever, A', carrying at its lower end a pawl, o, acting upon a ratchet-wheel, t, on the winding-shaft, for the purpose of rotating the same when the lever is vibrated by the attendant; but its greatest advantage consists in the fact that, being located as described, the drum and chains have no tendency to twist the frame out of shape. In machines as ordinarily constructed, having the winding-drum located considerably above the main frame, it is found that the strain of the chain causes the main frame to lose its proper form. The lever extends upward, as shown, near the driver's seat P, which is located in an elevated position, as usual, so that the attendant, while occupying the seat, may readily grasp and move the hand-lever, and owing to its extreme length raise the frame with ease. The arrangement represents a practical and easily-operated means for adjusting the height of the frame while the machine is in action—an operation which has hitherto been impossible or exceedingly difficult.

In practice it is found that whenever an excessive amount of power is required to propel the machine there is danger of the lifting-pinions acting to raise the frame automatically and at improper times, to prevent which it has been customary to employ upon the main axle a pivoted locking-dog, C', as shown in Fig. 6, the dog being provided at one end with a lip to engage in the rack and at the opposite end with a weight to keep it in engagement.

In order that the machine may be readily adjusted in the field, it is desirable that means shall be provided for holding the locking-dog out of action, and I therefore connect to the end of the dog, as shown in Figs. 1 and 5, a cord or rod, s, extending thence upward to the side of the elevator-frame near the driver's seat, and apply to the frame a spring clamp or dog, u, as shown in Fig. 1, to act upon and retain the cord. This clamp consists simply of the lever pivoted in its middle with a spring seated under one end, for the purpose of depressing the opposite end upon the cord. By means of this clamp and cord the attendant is enabled, while managing the team with one hand, to lift and secure the dog out of action with the other hand, so that he may then operate the elevating mechanism, one hand only being required to effect the elevation and depression of the frame.

In order to sustain the reel upon the machine and transmit motion thereto, I provide a reel-standard, F', having its lower end forked and mounted upon the two horizontal guiding-rods G'. The reel will be connected directly or indirectly with the upper end of this standard in any suitable manner, the present invention having no relation thereto. On one side of the standard F', I form bearings which receive a vertical shaft, H', the lower end of which carries the bevel-pinion I', receiving motion from a corresponding pinion, J', sustained by a horizontal shaft, K'. The shaft K' is mounted in fixed bearings on the harvester-frame, and is provided at its rear end with a sprocket-wheel or equivalent device, whereby it may receive motion from any other suitable part of the machine. The shaft is slotted longitudinally and the pinion arranged to slide freely thereon, the rotation of the shaft and pinion together being secured by means of a connecting-spline. The pinion is seated on the shaft between two arms, M', on the base of the sliding standard, this arrangement causing the pinion to slide with the standard as the latter is moved to keep the two pinions in gear. The forward-and-backward movement of the standard is effected by means of a rod, N', attached at one end to the standard, and provided at the opposite end with a rack, O', engaging with a sector-pinion on the lower end of a hand-lever, P', standing in such position that it may be operated by the driver. The shifting-rod is fastened by a foot-latch, R', mounted on the main frame and engaging at one end in the rack on the end of the rod, as shown.

A minor feature of my invention consists in means for sustaining the chain Z', by which the outer or grain wheel of the machine is held and adjusted. This roller (shown at m, Fig. 1) has usually been located in the center of the corner of the frame, and great difficulty has been encountered on account of its holding the chain in such position that it frequently failed to move the wheel, and because the pulley was frequently cramped and crowded out of position. In order to overcome these difficulties I sustain the pulley on the upper side of the frame by means of an angular plate, such as shown in Fig. 7. This plate is adapted to fit over and around the corner of the frame, and is provided at the top with an overhanging outwardly-extended jaw, in which the roller is mounted in the manner shown.

I am aware that a locking-dog engaging with a rack-bar has been connected with a foot-lever, whereby the dog could be held out of engagement by the continued pressure of the foot of the attendant, and this I do not claim, the object of my invention being to produce a machine wherein the elevation of the frame and the control of the devices therefor may be secured wholly by the hands of the operator, leaving his feet free for other purposes or uses.

Having thus described my invention, what I claim is—

1. In combination with the harvesting-frame supported by the single driving-wheel, substantially as shown, the longitudinally-sliding tongue, the two diagonal braces connected therewith, and the diagonal brace extending from the main shoe to the main frame, substantially as described.

2. In a harvesting-machine, the rectangular main frame having the grain-platform connected rigidly therewith, in combination with the single supporting-wheel mounted within said frame, the tongue connected with the inner corner of the frame, and three diagonal braces, G, H, and J, arranged in relation to the tongue and frame in the manner described and shown.

3. In combination with the wheeled main frame, the divided driving-shaft, the universal coupling, the two rigid supports attached to the main frame, and the movable support or bearing R', located at the rear end of the frame, substantially as shown.

4. In a harvester, the combination of the horizontal rectangular main frame having the rack-plates thereon, the main wheel, its axle, and the adjusting-pinions mounted thereon, the horizontal shaft Y, sustained upon and across the rear end of the frame in immediate proximity thereto, the winding-drum mounted upon said shaft and provided with chains connecting with the winding-drum on the main axle, and the ratchet-lever co-operating with a ratchet-wheel on said shaft and extending thence upward adjacent to the driver's seat, as shown, whereby the driver is enabled to raise and lower the machine by hand, and the strains of the lifting-chain applied to the main frame in such manner that the latter is retained in its rectangular form.

5. In combination with the main frame of the harvester, the upright standard F', connected with the said main frame by a horizontal sliding connection, substantially as described, means, substantially as described, for moving said standard, the vertical shaft H', mounted in said standard and provided with a pinion, I', at its lower end, the horizontal drawing-shaft K', and the sliding pinion J', seated upon said shaft and arranged to drive the pinion I', as described and shown.

6. In a harvester, the combination of the main frame and its supporting-wheel with the rack-plates thereon, the main wheel and axle, the frame-supporting pinions mounted upon said axle and engaging with the racks, the locking-dog C' to prevent the rotation of said pinions, and a manual device, substantially as shown, for holding said dog out of action, said device extending upward in the manner described in position to be operated by the driver.

7. In combination with the main frame, its racks, the main wheel and axle, the pinions T, the dog C', arranged, as described, to prevent the movement of the pinions, the cord s, extending upward from said dog, and the spring-clamp U, acting to hold the cord, whereby the operator is enabled to disengage the dog C' and hold the same out of action during the vertical adjustment of the frame, thus leaving the one hand free for the management of the team.

8. In combination with the main frame and the frame-elevating chain, the angular plate having at its upper end the overhanging jaw to receive and sustain the pulley, as set forth.

GEORGE ESTERLY.

Witnesses:
W. CLARENCE DUVALL,
PHILIP T. DODGE.